(12) United States Patent
Pacella et al.

(10) Patent No.: US 9,517,789 B2
(45) Date of Patent: Dec. 13, 2016

(54) INFANT STROLLER APPARATUS

(71) Applicant: Wonderland Nurserygoods Company Limited, Kwai Chung N.T. (HK)

(72) Inventors: Jonathan M. Pacella, Coatesville, PA (US); Andrew J. Winterhalter, West Lawn, PA (US); Nathanael Saint, Morgantown, PA (US); William B. Bellows, Wyomissing, PA (US); Jerry S. Ingraham, Denver, PA (US)

(73) Assignee: Wonderland Nurserygoods Company Limited, Hong Kong (HK)

( * ) Notice: Subject to any disclaimer, the term of this patent is extended or adjusted under 35 U.S.C. 154(b) by 0 days.

(21) Appl. No.: 14/749,840

(22) Filed: Jun. 25, 2015

(65) Prior Publication Data

US 2016/0001804 A1 Jan. 7, 2016

Related U.S. Application Data

(60) Provisional application No. 61/998,674, filed on Jul. 3, 2014, provisional application No. 62/097,925, filed on Dec. 30, 2014, provisional application No. 62/176,896, filed on Mar. 23, 2015.

(51) Int. Cl.
| | |
|---|---|
| *B62B 9/02* | (2006.01) |
| *B62B 7/00* | (2006.01) |
| *B62B 7/06* | (2006.01) |
| *B62B 9/20* | (2006.01) |
| *B62B 7/08* | (2006.01) |
| *B62B 7/14* | (2006.01) |
| *B62B 9/28* | (2006.01) |
| *B62B 9/10* | (2006.01) |
| *B62B 5/08* | (2006.01) |

(52) U.S. Cl.
CPC ............... *B62B 9/02* (2013.01); *B62B 7/008* (2013.01); *B62B 7/06* (2013.01); *B62B 7/08* (2013.01); *B62B 7/142* (2013.01); *B62B 7/145* (2013.01); *B62B 9/20* (2013.01); *B62B 9/28* (2013.01); *B62B 5/087* (2013.01); *B62B 9/102* (2013.01)

(58) Field of Classification Search
CPC ...................................................... B62B 7/008
See application file for complete search history.

(56) References Cited

U.S. PATENT DOCUMENTS

| | | | |
|---|---|---|---|
| 6,746,075 B2* | 6/2004 | Cheng ................ | B62B 9/26 297/149 |
| 8,251,382 B2* | 8/2012 | Chen ................... | B62B 7/142 280/47.38 |
| 2015/0232114 A1* | 8/2015 | Gillett ................. | B62B 7/12 280/30 |

* cited by examiner

*Primary Examiner* — Erez Gurari
(74) *Attorney, Agent, or Firm* — Baker & McKenzie LLP; David I. Roche

(57) ABSTRACT

An infant stroller apparatus includes a stroller frame, two first seat mounts respectively affixed with the stroller frame at a left and a right side thereof, and two second seat mounts respectively affixed with the stroller frame and arranged behind the first seat mounts. Each of the first seat mounts is positionable to protrude upward, the first seat mounts being configured to detachably engage with any of a stroller seat and an infant car seat as a first seat. Each of the second seat mounts is positionable to protrude upward, the second seat mounts being configured to detachably engage with any of a stroller seat and an infant car seat as a second seat.

29 Claims, 18 Drawing Sheets

INFANT STROLLER APPARATUS

CROSS-REFERENCE TO RELATED APPLICATION(S)

This application respectively claims priority to U.S. Provisional Patent Application No. 61/998,674 filed on Jul. 3, 2014; and to U.S. Provisional Patent Application No. 62/097,925 filed on Dec. 30, 2014; and to U.S. Provisional Patent Application No. 62/176,896 filed on Mar. 23, 2015, the disclosures of which are incorporated herein by reference.

BACKGROUND

1. Field of the Invention

The present invention relates to infant stroller apparatuses.

2. Description of the Related Art

Presently, there are many double strollers on the market. Some double strollers may include two seats placed side by side, while others may have a front seat and a rear seat placed behind the front seat. Usually, the seats of a double stroller are permanently attached to the stroller frame, some of them allowing the installation of one or two infant car seats in the area of the seats. Because the seats are permanently attached to the stroller frame, the conventional double strollers have limited seating options. Moreover, the placement of an infant car seat on the stroller seat may result in an awkward appearance.

Therefore, there is a need for an infant stroller apparatus that is more flexible in use, and address at least the foregoing issues.

SUMMARY

The present application describes an infant stroller apparatus that can accommodate multiple seats and offer more convenient options for installing the seats. In one embodiment, the infant stroller apparatus includes a stroller frame, two first seat mounts respectively affixed with the stroller frame at a left and a right side thereof, and two second seat mounts respectively affixed with the stroller frame and arranged behind the first seat mounts. Each of the first seat mounts is positionable to protrude upward, the first seat mounts being configured to detachably engage with any of a stroller seat and an infant car seat as a first seat. Each of the second seat mounts is also positionable to protrude upward, the second seat mounts being configured to detachably engage with any of a stroller seat and an infant car seat as a second seat.

In another embodiment, the infant stroller apparatus includes a stroller frame, two first seat mounts respectively affixed with the stroller frame at a left and a right side thereof, and two second seat mounts respectively affixed with the stroller frame at the left and right sides thereof and arranged spaced apart from the first seat mounts. The first seat mounts are configured to detachably engage with a first seat, the second seat mounts are configured to detachably engage with a second seat, and each of the first and second seat mounts is adjustable between a deployed state and a stowed state.

Advantages of the infant stroller apparatus described herein include the ability to provide a stroller frame that can receive at least two detachable seats in multiple seating configurations according to the caregiver's needs. Accordingly, the infant stroller apparatus can be more flexible in use.

DETAILED DESCRIPTION OF THE EMBODIMENTS

Figure 1:
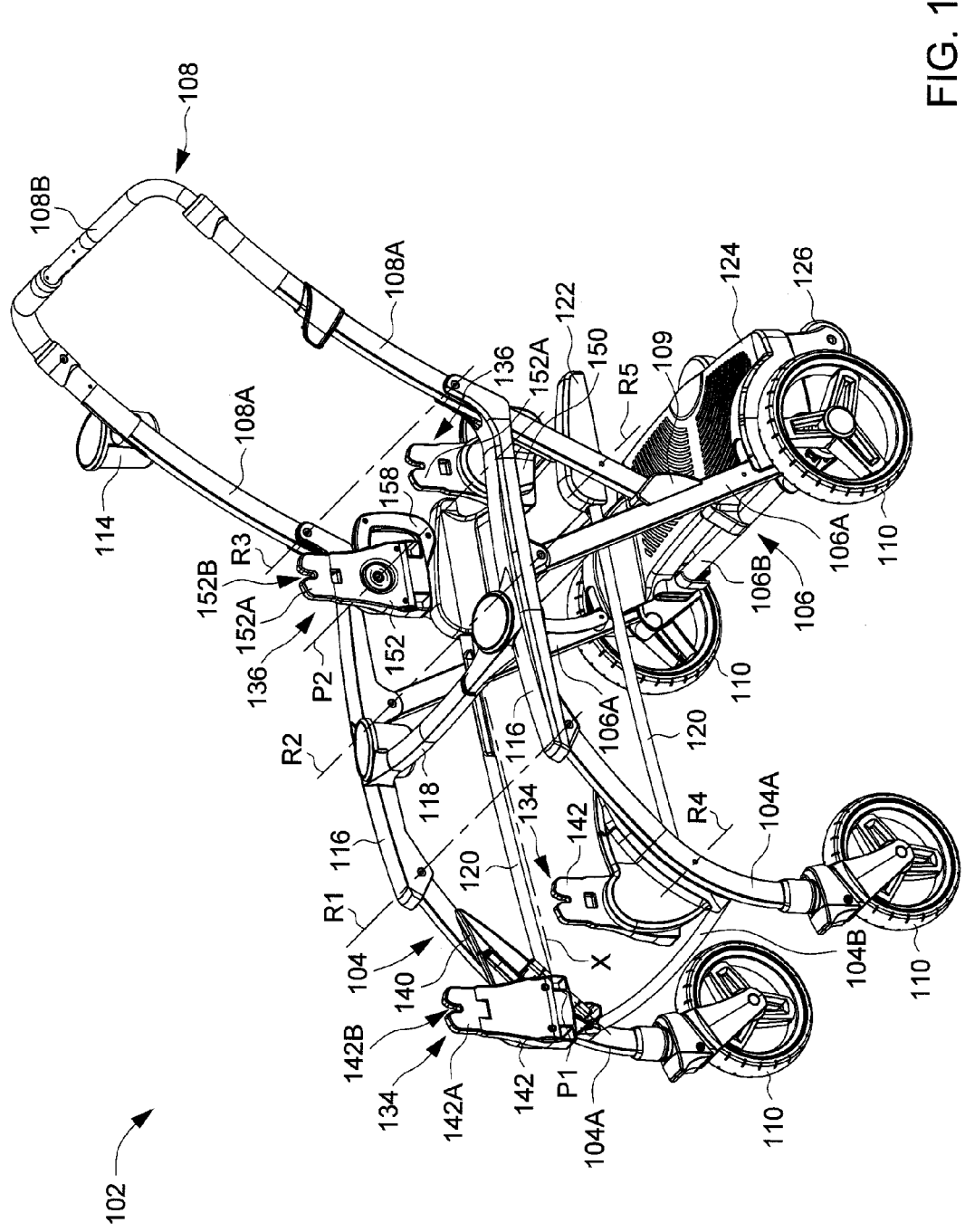
FIG. 1 is a perspective view illustrating a stroller frame of an infant stroller apparatus.
Figure 2:
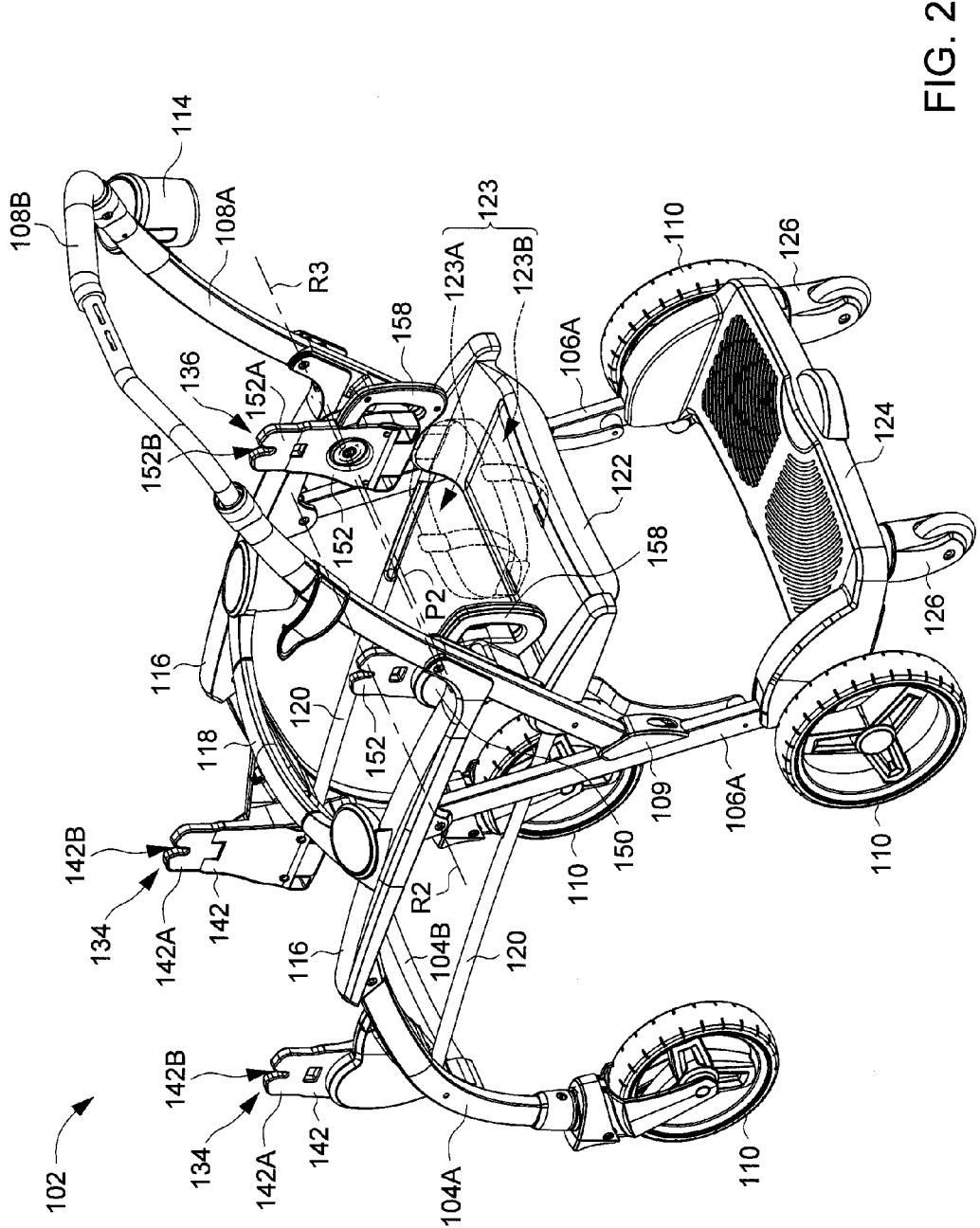
FIG. 2 is another perspective view illustrating the stroller frame shown FIG. 1.
Figure 3:
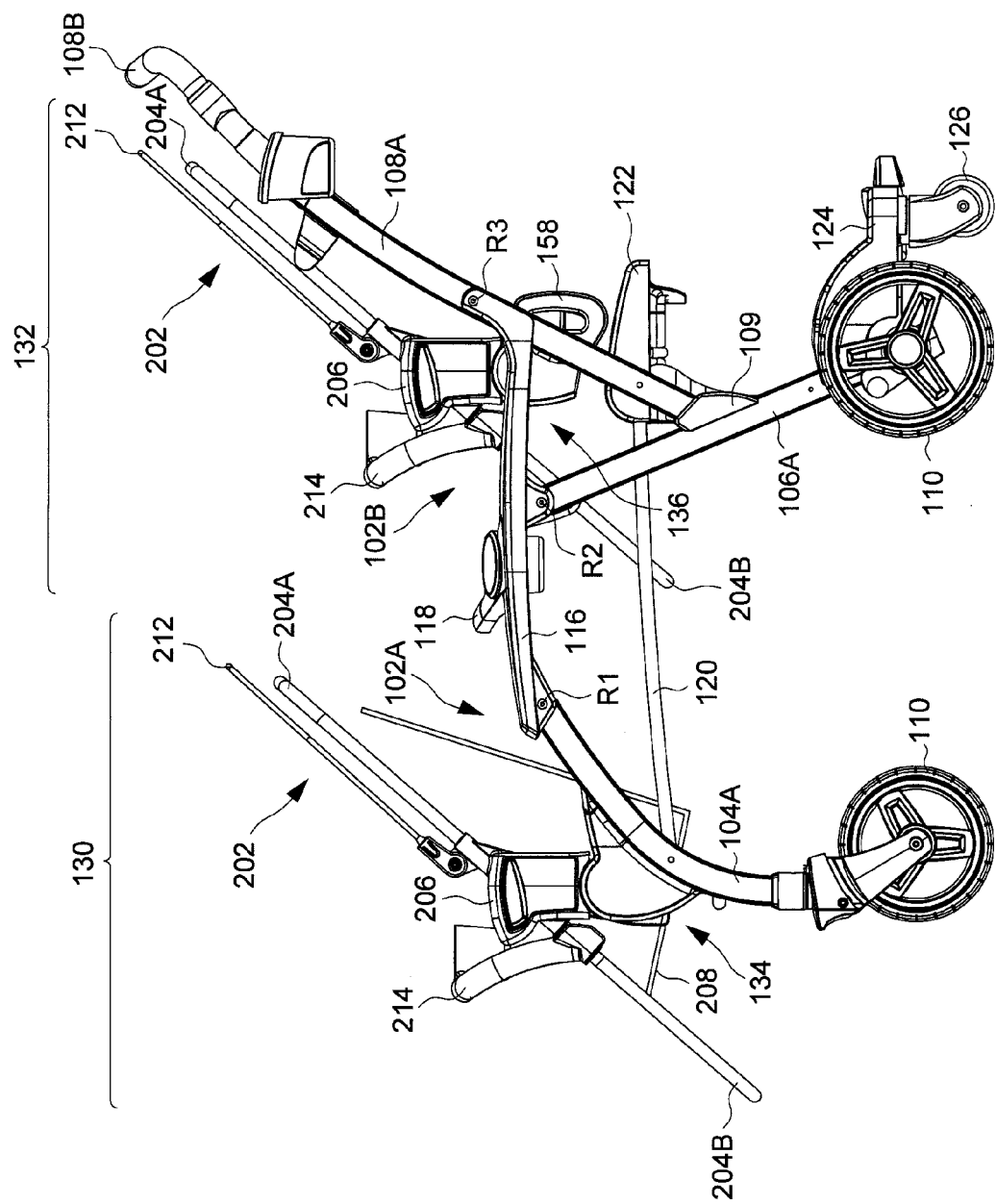
FIG. 3 is a schematic view illustrating the infant stroller apparatus of FIG. 1 having two detachable seats installed thereon.

FIGS. 1-3 are schematic views illustrating an embodiment of an infant stroller apparatus 100 capable of receiving a plurality of detachable seats. The infant stroller apparatus 100 can include a stroller frame 102 on which the detachable seats may be desirably attached. The stroller frame 102 can include a front leg frame 104, a rear leg frame 106 and a handle frame 108. The front and rear leg frames 104 and 106 can be respectively formed by the assembly of one or multiple tubular segments. For example, the front leg frame 104 can include two front leg segments 104A respectively disposed at a left and a right side of the stroller frame 102, and a transversal segment 104B connected with the two front leg segments 104A. The rear leg frame 106 can include two rear leg segments 106A respectively disposed at the left and right sides of the stroller frame 102, and a transversal segment 106B connected with the two rear leg segments 106A. Lower end portions of the front and rear leg frames 104 and 106 can be respectively provided with wheel assemblies 110. Moreover, the two front leg segments 104A of the front leg frame 104 and the two rear leg segments 106A of the rear leg frame 106 can sideways delimit a central space for arrangement of multiple seats.

The handle frame 108 can be formed by the assembly of one or more tubular segments. For example, the handle frame 108 can include two handle segments 108A respectively disposed at the left and right sides of the stroller frame 102, and a transversal segment 108B connected with the two handle segments 108A. A cup holder 114 may be connected with one of the handle segments 108A at an elevated position. A lower end portion of each handle segment 108A can abut against a coupling socket 109 affixed with the corresponding rear leg segment 106A. The handle segment 108A can rest adjacent to the coupling socket 109 when the stroller frame 102 is in the unfolded state (as shown in FIGS. 1 and 2), and can move away from the coupling socket 109 when the stroller frame 102 is folded to a collapse state (not shown).

Referring again to FIGS. 1 and 2, the stroller frame 102 can further include two side segments 116 respectively arranged at the left and right sides of the stroller frame 102. The side segment 116 at each of the left and right sides is respectively connected pivotally with an upper end of the front leg segment 104A about a pivot axis R1, with an upper end of the rear leg segment 106A about a pivot axis R2, and with an intermediate portion of the handle segment 108A about a pivot axis R3. The pivot axes R1, R2 and R3 extend transversally from the left to right side of the stroller frame 102, the pivot axis R2 being located between the pivot axes R1 and R3 along a lengthwise axis X extending from a rear to a front of the stroller frame 102, and the pivot axis R3 being arranged higher than the pivot axes R1 and R2.

In some embodiments, intermediate regions of the two side segments 116 can further be affixed with a crossbar 118 that extends transversally from the left to right side of the stroller frame 102. The crossbar 118 can be connected with each side segment 116 at a location between the pivot axes R1 and R2, in particular near the pivot axis R2. The crossbar 118 can be provided as a guard member adding protection for a seat installed on the stroller frame 102 in a rear position. Moreover, cup holders may be affixed with the crossbar 118, e.g., for use by a child sitting in the rear position.

Referring to FIGS. 1 and 2, the stroller frame 102 can further include two other side segments 120 respectively arranged at the left and right sides of the stroller frame 102 below the two side segments 116. The side segment 120 at each of the left and right sides is respectively connected pivotally with the front leg segment 104A about a pivot axis R4 located below the pivot axis R1, and with the handle segment 108A about a pivot axis R5 located below the pivot axis R3. The side segments 120 can be attached with a storage basket (not shown). Moreover, respective rear portions of the two side segments 120 can be affixed with a bench seat 122, which can provide sitting support for a child facing forward or rearward.

Referring to FIG. 2, in some embodiments, the bench seat 122 can be provided with a harness 123 (shown with phantom lines in FIG. 2) that can be used for securing a child sitting thereon. The harness 123 can include two sets of webbing sections 123A and 123B that can be connected with each other by two buckles. Each of the two webbing sections 123A and 123B can have a crotch strap and a waist strap, the waist straps of the two webbing sections 123A and 123B being connectible with each other via buckles. The harness 123 can be used to secure a child sitting on the bench seat 122 either facing forward or rearward.

Referring again to FIGS. 1 and 2, the infant stroller apparatus 100 can further include a stand platform 124 arranged at a rear and bottom of the stroller frame 102. The stand platform 124 can be affixed with the transversal segment 106B of the rear leg frame 106. For stable support, the stand platform 124 can be provided with two caster assemblies 126 arranged behind the wheel assemblies 110 of the rear leg frame 106.

In conjunction with FIGS. 1 and 2, FIG. 3 is a schematic view illustrating the stroller frame 102 installed with two detachable seats 130 and 132. The stroller frame 102 described herein can receive the installation of the two detachable seats 130 and 132 (e.g., two stroller seats 202) in two positions that are spaced apart from each other along the lengthwise axis X. To this purpose, the infant stroller apparatus 100 can include two seat mounts 134 respectively arranged at the left and right sides near a front of the stroller frame 102, and two seat mounts 136 respectively arranged at the left and right sides behind the seat mounts 134 and near a rear of the stroller frame 102. More specifically, the two seat mounts 134 can be respectively affixed with the two front leg segments 104A of the stroller frame 102, and the two seat mounts 136 can be spaced apart from the two seat mounts 134 and respectively affixed with the handle segments 108A. The two seat mounts 134 can detachably engage with the first seat 130 in a front seat area 102A located in front of the crossbar 118, and the two seat mounts 136 can detachably engage with the second seat 132 in a rear seat area 102B behind the crossbar 118.

In one embodiment, the seat mounts 136 can be arranged above the bench seat 122 and extend higher than the seat mounts 134 while the infant stroller apparatus 100 is in the unfolded state. Owing to the height difference between the seat mounts 134 and the seat mounts 136, the second seat 132 placed in the rear position can rise higher than the first seat 130 placed in the front position, which can improve visibility for the child sitting on the second seat 132.

Figure 4:
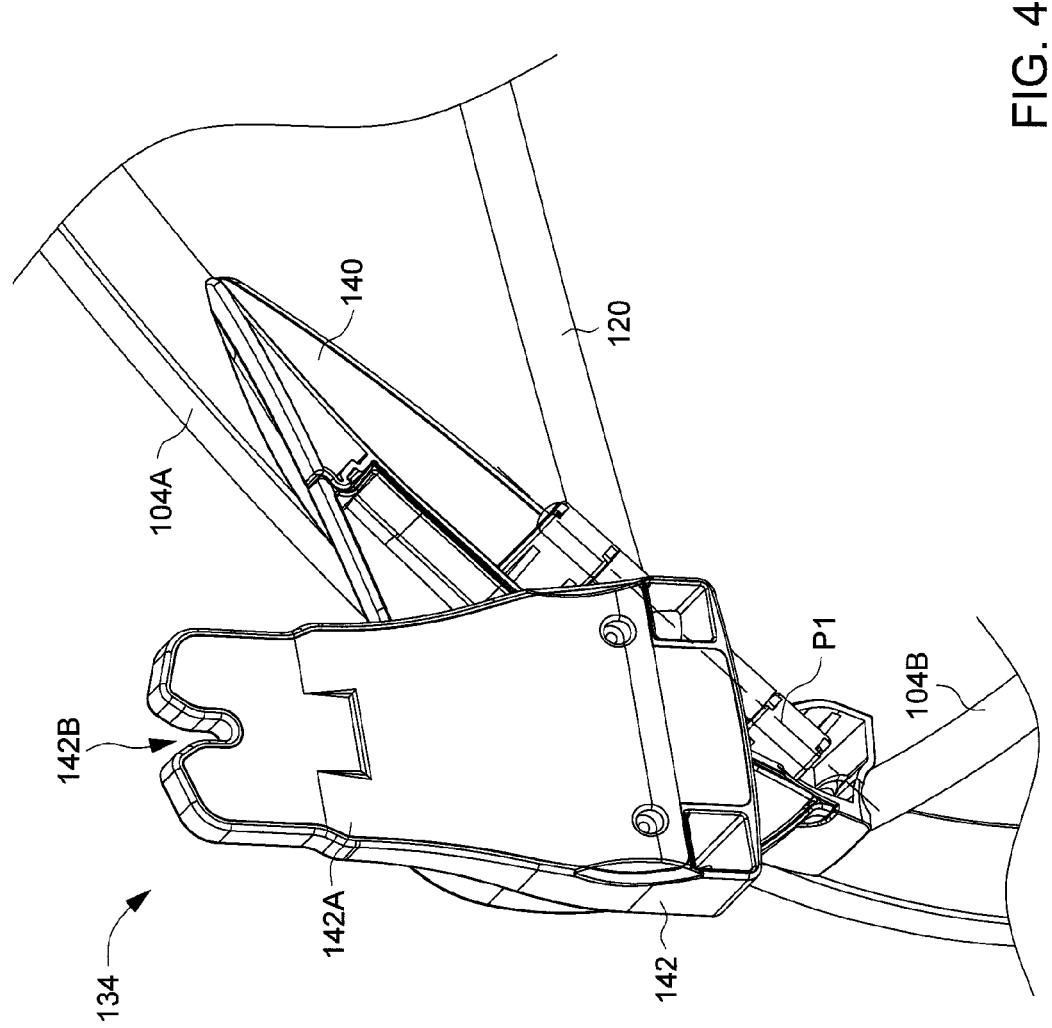
FIG. 4 is a schematic view illustrating a seat mount provided in the stroller frame shown in FIG. 1.

The two seat mounts 134 disposed at the left and right sides of the stroller frame 102 can be similar in construction. In conjunction with FIGS. 1 and 2, FIG. 4 is an enlarged view illustrating one seat mount 134. The seat mount 134 can include a bracket 140 affixed with one corresponding front leg segment 104A, and a mount portion 142 pivotally connected with the bracket 140 about a pivot axis P1. The mount portion 142 can have an elongated and generally symmetrical shape 142A provided with a notch 142B, and can detachably engage with any of a stroller seat or an infant car seat.

Figure 5:
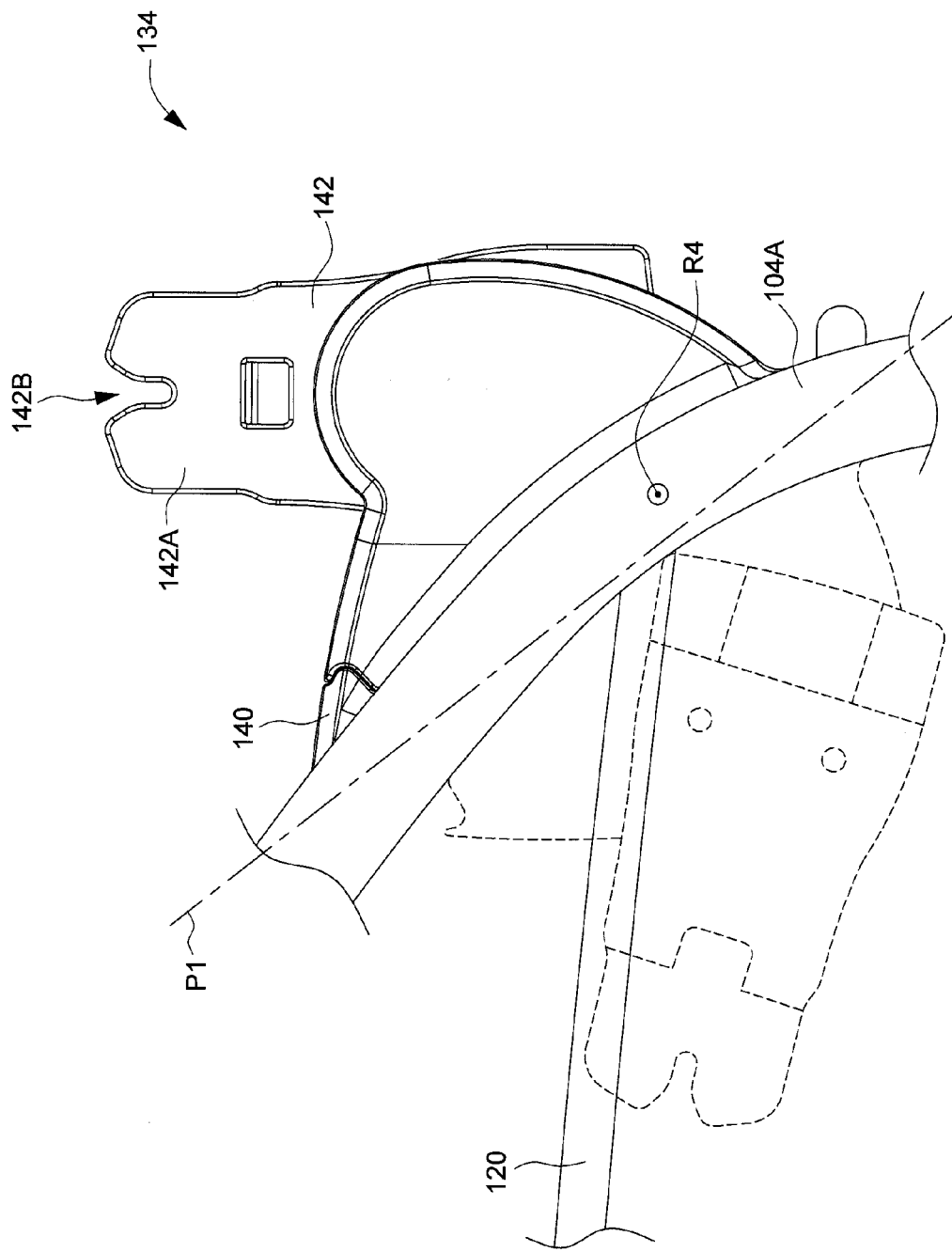
FIG. 5 is a schematic view illustrating adjustment of the seat mount shown in FIG. 4 between a deployed state and a stowed state.

As better shown in FIG. 1, the pivot axes P1 of the mount portions 142 can extend up and down generally parallel to the left and right sides of the stroller frame 102. In one embodiment, the pivot axes P1 may be exemplary inclined at an angle relative to a vertical axis. The mount portions 142 are respectively rotatable about the pivot axes P1 between a deployed state for installation of the seat 130, and a stowed state for facilitating storage of the stroller frame 102. FIG. 5 is a schematic view illustrating the mount portion 142 in the deployed and stowed state. When it is positioned in the deployed state (shown with solid lines in FIG. 5), the mount portion 142 is deployed to a forward position relative to the front leg segment 104A and extends substantially vertical and upward from the bracket 140. When it is in the stowed state (shown with phantom lines in FIG. 5), the mount portion 142 is retracted toward the front leg segment 104A to a position extending behind the front leg segment 104A. The orientation of the mount portion 142 in the stowed state can disable the mount of a seat thereon.

The two seat mounts 136 disposed at the left and right sides of the stroller frame 102 can be similar in construction. In conjunction with FIGS. 1 and 2, FIGS. 6-8 are various schematic views illustrating the construction and operation of one seat mount 136. The seat mount 136 can include a bracket 150 affixed with one corresponding handle segment 108A, a mount portion 152 pivotally connected with the bracket 150, and a spring 154. The bracket 150 can be connected with the handle segment 108A in a region between the two pivot axes R3 and R5. The bracket 150 can have an inner cavity 150A in which is provided a shaft portion 150B. The shaft portion 150B can define a pivot axis P2 about which the mount portion 152 is pivotally connected with the bracket 150. As better shown in FIG. 1, the pivot axis P2 can extend transversally from the left to right side of the stroller frame 102, and the two mount portions 152 can be pivotally assembled generally about the same pivot axis P2 for rotation in two respective planes generally parallel to the left and right sides of the stroller frame 102. Moreover, the inner cavity 150A of the bracket 150 can further include a plurality of teeth 150C disposed around the shaft portion 150B.

The mount portion 152 can have an elongated and generally symmetrical shape 152A that has a notch 152B and can detachably engage with any of a stroller seat or an infant car seat. Moreover, the mount portion 152 has a plurality of teeth 152C that can engage with the teeth 150C of the bracket 150, and is further affixed with a handle 158. The handle 158 can protrude from a side edge of the mount portion 152, and can have any suitable shapes that can be grasped with a hand. Moreover, the handle 158 can rotate in unison with the mount portion 152 about the pivot axis P2.

In addition to pivotal movements, the assembly of the mount portion 152 with the bracket 150 can further allow the mount portion 152 to slide transversally along the pivot axis P2 away from or toward the bracket 150 between an unlocked and a locked position. More specifically, the mount portion 152 can slide along the pivot axis P2 between an unlocked position where the teeth 152C are disengaged from the teeth 150C of the bracket 150 for allowing rotation of the mount portion 152 relative to the bracket 150, and a locked position where the teeth 152C are engaged with the teeth 150C of the bracket 150 to rotationally lock the mount portion 152 with the bracket 150.

The spring 154 can have two ends respectively connected with the bracket 150 and the mount portion 152. The spring 154 can bias the mount portion 152 toward the locked position engaged with the bracket 150.

Figure 6:
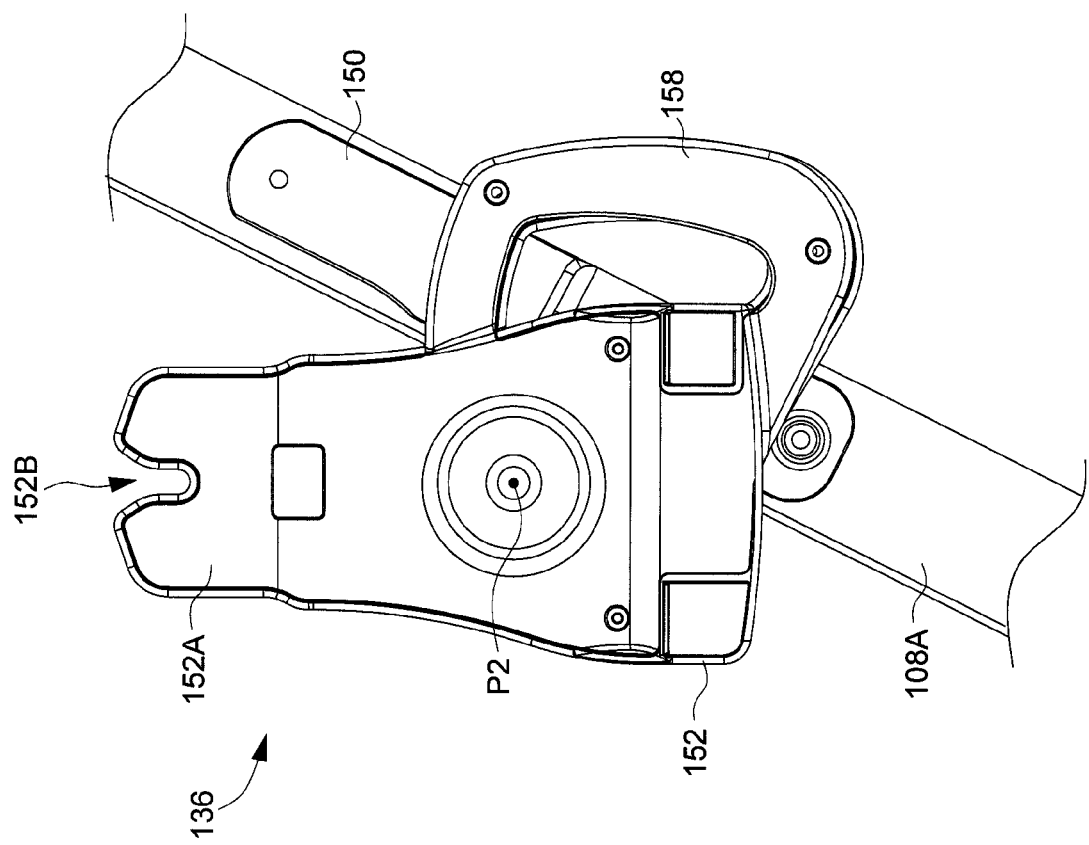
FIG. 6 is a schematic view illustrating another seat mount provided in the stroller frame shown in FIG. 1.
Figure 7:
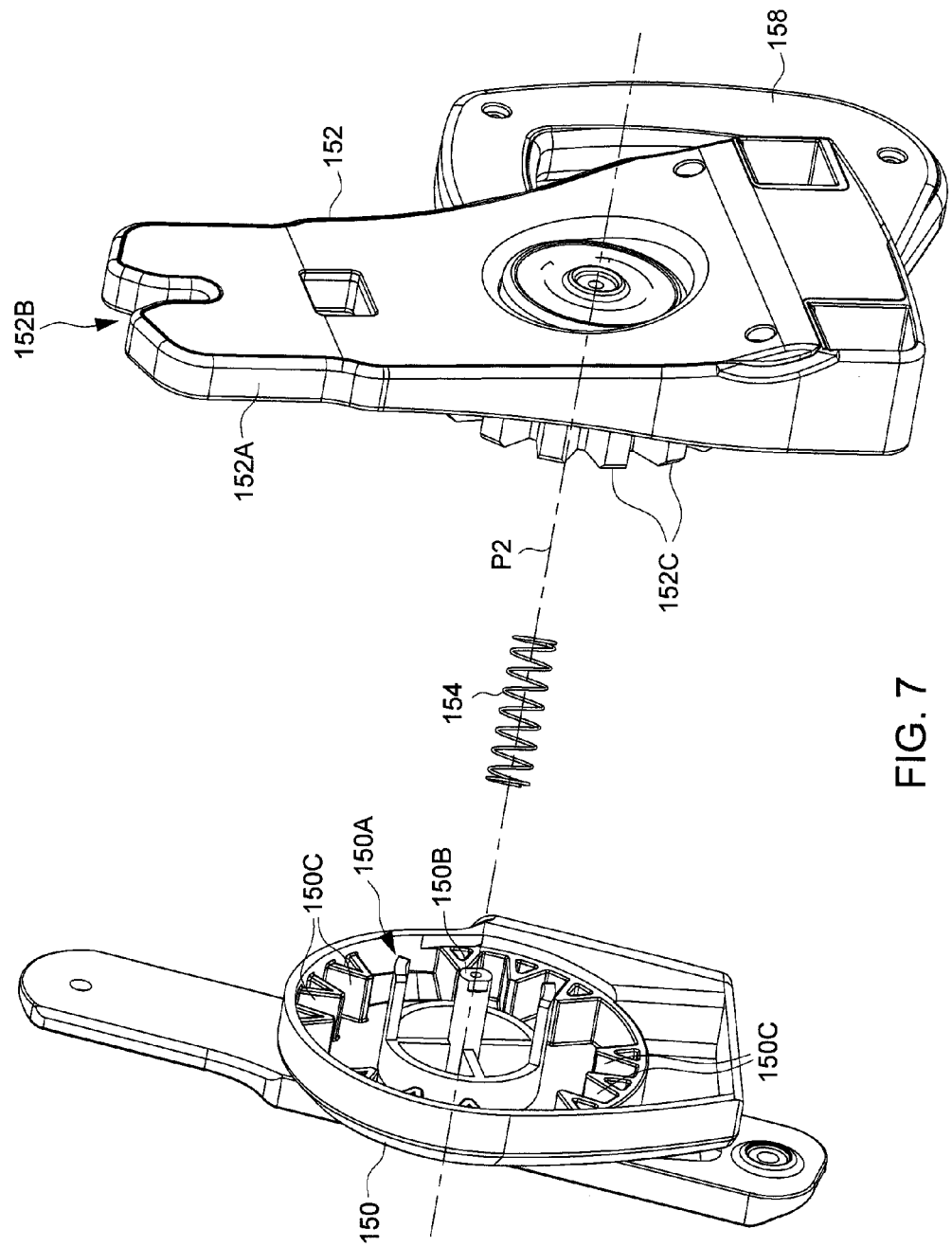
FIG. 7 is an exploded view illustrating the seat mount shown in FIG. 6.
Figure 8:
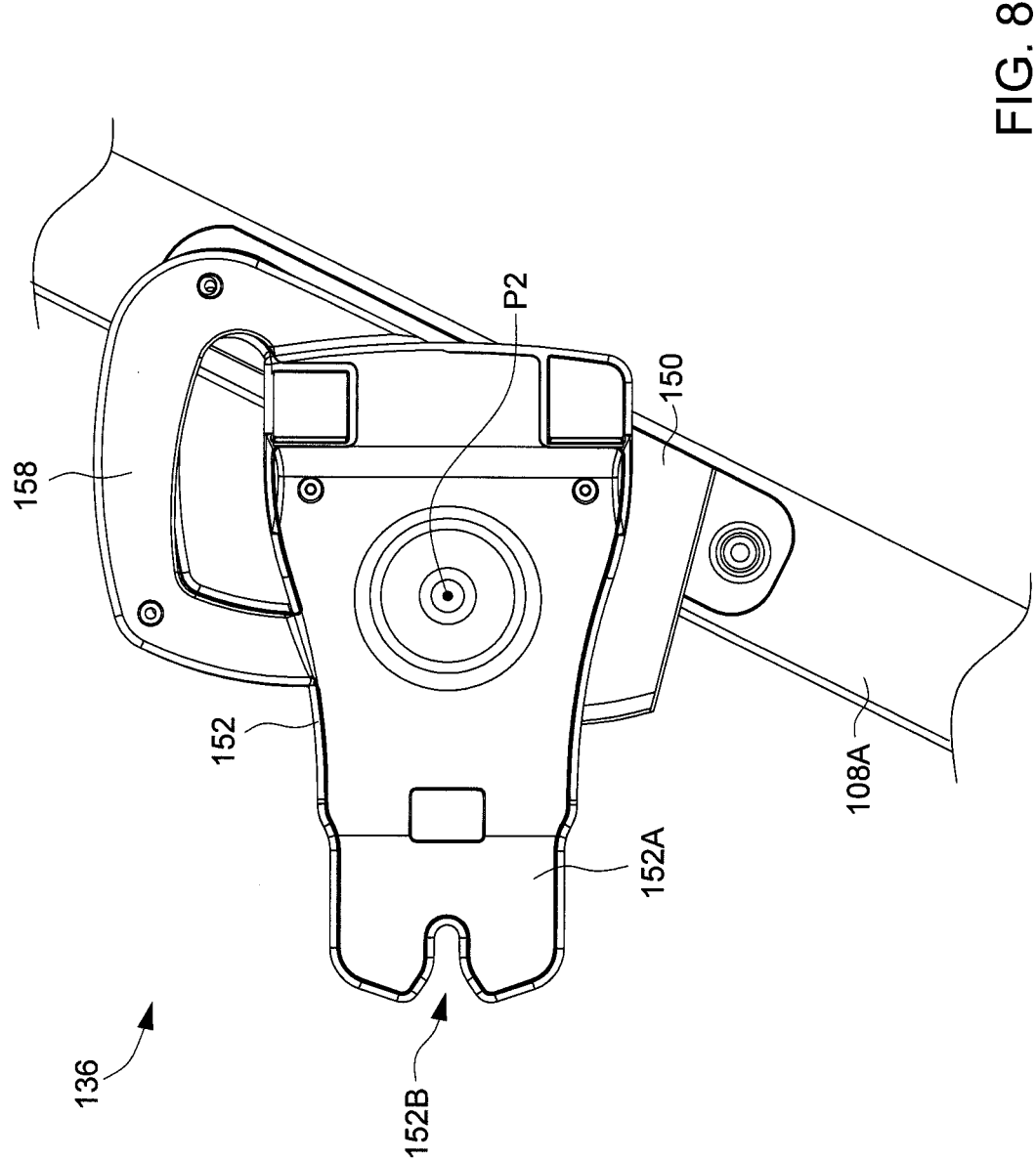
FIG. 8 is a schematic view illustrating the seat mount shown in FIG. 6 in a stowed state.

Each of the two mount portions 152 can rotate independently about the pivot axis P2 between a deployed state for installation of the seat 132, and a stowed state for facilitating storage of the stroller frame 102. FIGS. 6 and 8 are schematic views respectively illustrating the mount portion 152 in the deployed and stowed state. When it is positioned in the deployed state shown in FIG. 6, the mount portion 152 is deployed to a forward position relative to the handle segment 108A and extends substantially vertical and upward above the pivot axis P2 and the handle 158. Meanwhile, the handle 158 protrudes rearward with respect to the mount portion 152 and the pivot axis P2. Under the biasing action applied by the spring 154, the teeth 152C of the mount portion 152 can engage with the teeth 150C of the bracket 150 to keep the mount portion 152 locked in the deployed state.

For stowing the mount portion 152, a caregiver can pull the mount portion 152 to slide transversally along the pivot axis P2 away from the bracket 150, which can disengage the teeth 152C of the mount portion 152 from the teeth 150C of the bracket 150. The mount portion 152 is thereby unlocked, and then can be rotated downward about the pivot axis P2 to the stowed state. The handle 158 can rotate along with the mount portion 152 from the deployed state to the stowed state. When the mount portion 152 has reached the stowed position, the caregiver can release the mount portion 152. The mount portion 152 then can be urged by the spring 154 to slide along the pivot axis P2 toward the bracket 150 so as to have the teeth 152C engaged with the teeth 150C of the bracket 150. The mount portion 152 can be thereby locked in the stowed state, which is shown in FIG. 8. In the stowed state, the mount portion 152 can extend rearward from the pivot axis P2 and slightly incline downward, which can disable the mount of a seat thereon.

While the mount portion 152 is in the stowed state, the handle 158 protrudes upward above the pivot axis P2 and the mount portion 152. In this configuration, a child standing on the stand platform 124 facing the front of the stroller frame 102, or sitting on the bench seat 122 can grasp the two handles 158 for support.

Figure 9:
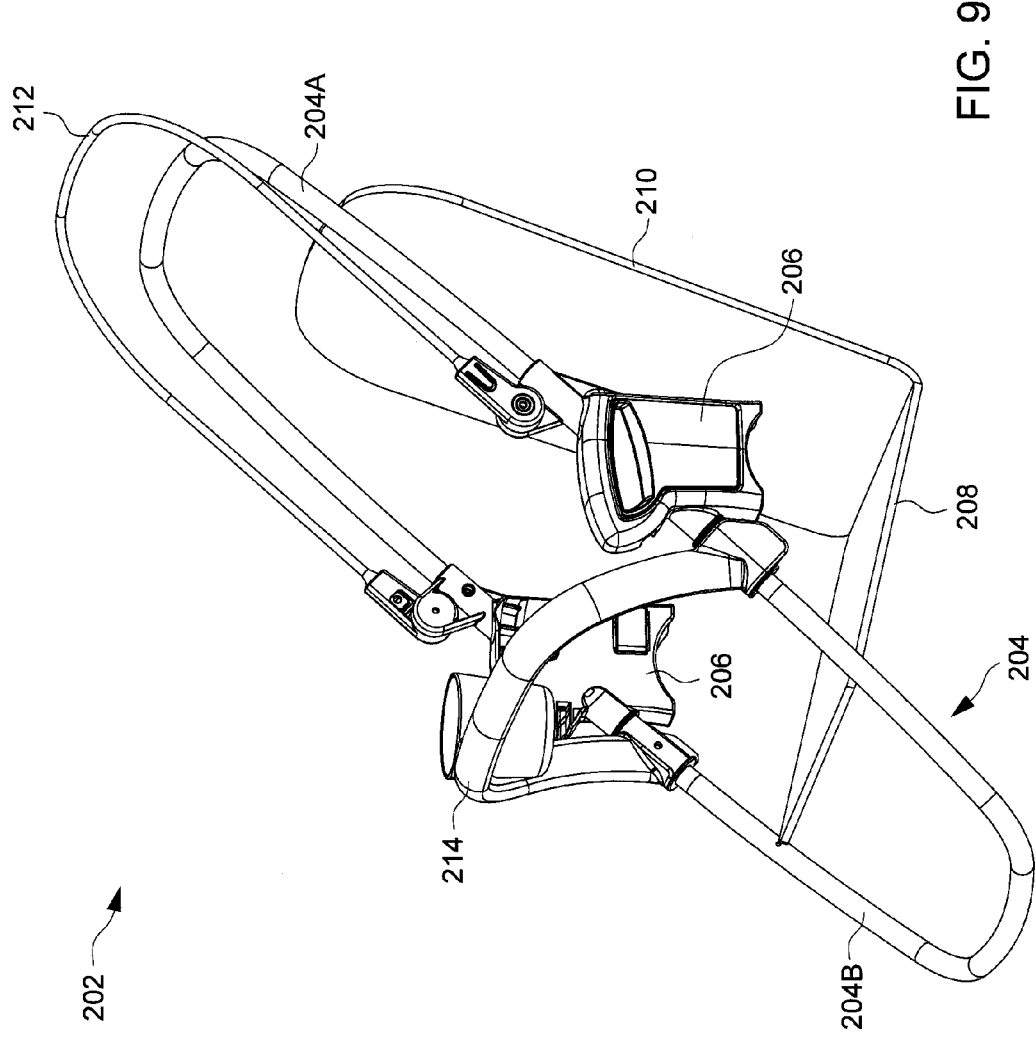
FIG. 9 is a schematic view illustrating an example of a stroller seat installable in the infant stroller apparatus shown in FIG. 1.

Different types of detachable seats may be installed on the seat mounts 134 and 136. FIG. 9 is a schematic view illustrating a stroller seat 202 that can be installed on any of the seat mounts 134 and 136 of the stroller frame 102. The stroller seat 202 can exemplary include a rigid seat frame 204, two sockets 206, a seat portion 208 and a backrest 210. The seat frame 204 can be exemplary formed by a tubular assembly, and can include an upper and a lower frame portion 204A and 204B. At the left and right side of the seat frame 204, the two sockets 206 can be respectively affixed with the upper and lower frame portions 204A and 204B. The upper frame portion 204A can extend rearward and upward from the two sockets 206, and the lower frame portion 204B can extend forward and downward from the two sockets 206. The seat portion 208 can be supported by the seat frame 204, and the backrest 210 may be pivotally connected with the seat portion 208. Additional utility features provided on the stroller seat 202 can exemplary include a canopy frame 212 that is pivotally connected with the upper frame portion 204A, and a front guard member 214 extending transversally and affixed with the lower frame portion 204B. The sockets 206 can respectively receive the engagement of the mount portions 142 of the seat mounts 134 when the stroller seat 202 is installed in the front seat area 102A, or the engagement of the mount portions 152 of the seat mounts 136 when the stroller seat 202 is installed in the rear seat area 102B. Owing to the symmetrical shapes of the mount portions 142 and 152, the stroller seat 202 can be installed facing forward or rearward in any of the front seat area 102A and the rear seat area 102B.

Figure 10:
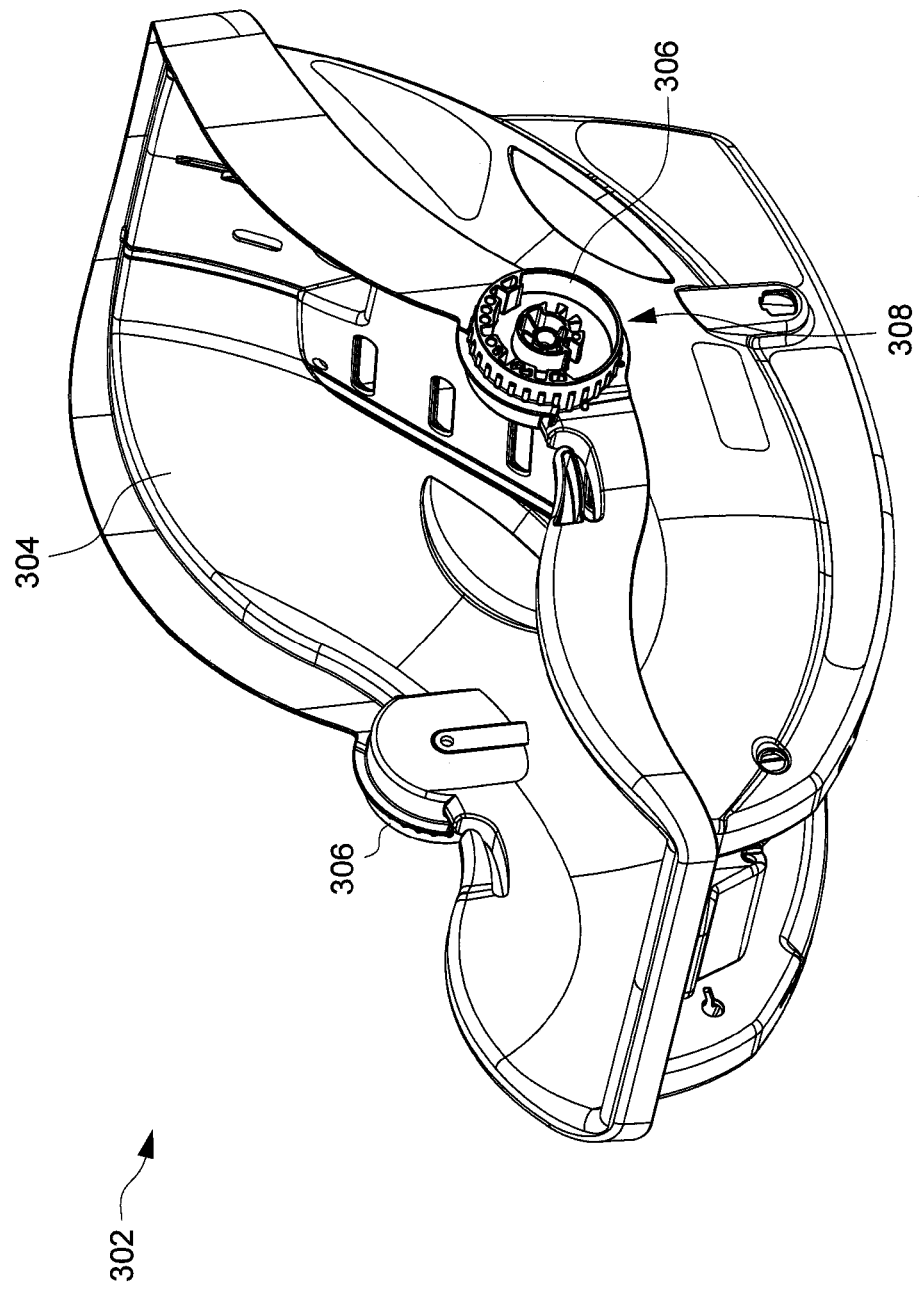
FIG. 10 is a schematic view illustrating an example of an infant car seat installable in the infant stroller apparatus shown in FIG. 1.

FIG. 10 is a schematic view illustrating an infant car seat 302 that can be installed on any of the seat mounts 134 and 136 of the stroller frame 102. The infant car seat 302 can include a seat shell 304 having a left and a right side respectively affixed with coupling rings 306 for pivotally connecting a carrying handle (not shown). The seat shell 304 can further include two sockets 308 respectively arranged at an inner side of the coupling rings 306. The sockets 308 can respectively receive the engagement of the mount portions 142 of the seat mounts 134 when the infant car seat 302 is installed in the front seat area 102A, or the engagement of the mount portions 152 of the seat mounts 136 when the infant car seat 302 is installed in the rear seat area 102B. Like the stroller seat 202, the infant car seat 302 may be installed facing forward or rearward in any of the front seat area 102A and the rear seat area 102B.

In conjunction with FIG. 3, FIGS. 11-16 are schematic views illustrating some exemplary configurations of seat installations on the stroller frame 102 of the infant stroller apparatus 100. In FIG. 3, the infant stroller apparatus 100 is shown as exemplary having two stroller seats 202 respectively engaged with the seat mounts 134 and 136 in the front and rear seat areas 102A and 102B. Both the two stroller seats 202 are arranged facing forward on the stroller frame 102. The position of the crossbar 118 between the seat mounts 134 and the seat mounts 136 can prevent the backrest 210 of the front stroller seat 202 from encroaching into the rear seat area 102B.

Figure 11:
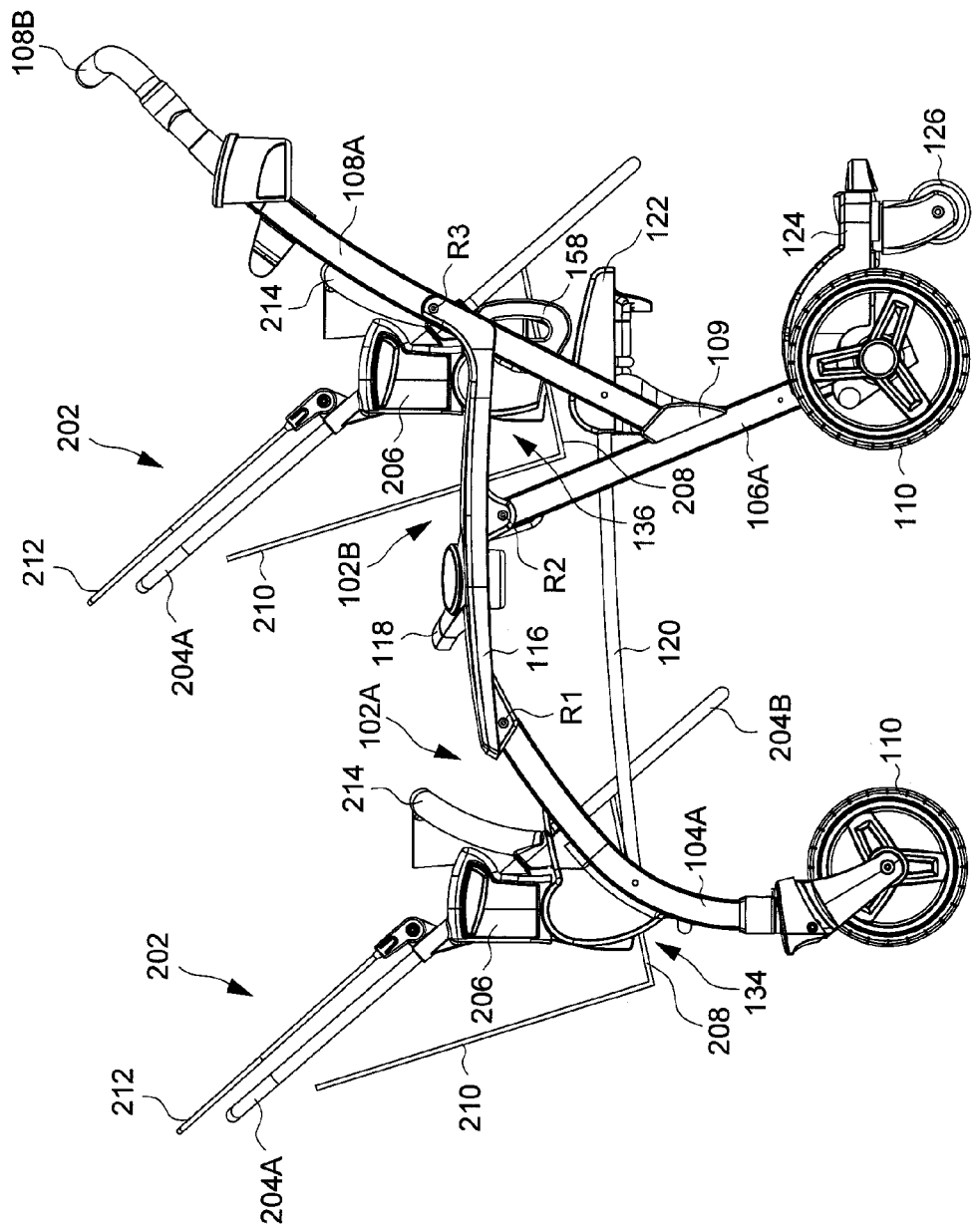
FIG. 11 is a schematic view illustrating a configuration of the infant stroller apparatus including two stroller seats installed facing rearward.

In FIG. 11, the infant stroller apparatus 100 is shown as having two stroller seats 202 respectively engaged with the seat mounts 134 and 136 in the front and rear seat areas 102A and 102B. Both the two stroller seats 202 are arranged facing rearward.

Figure 12:
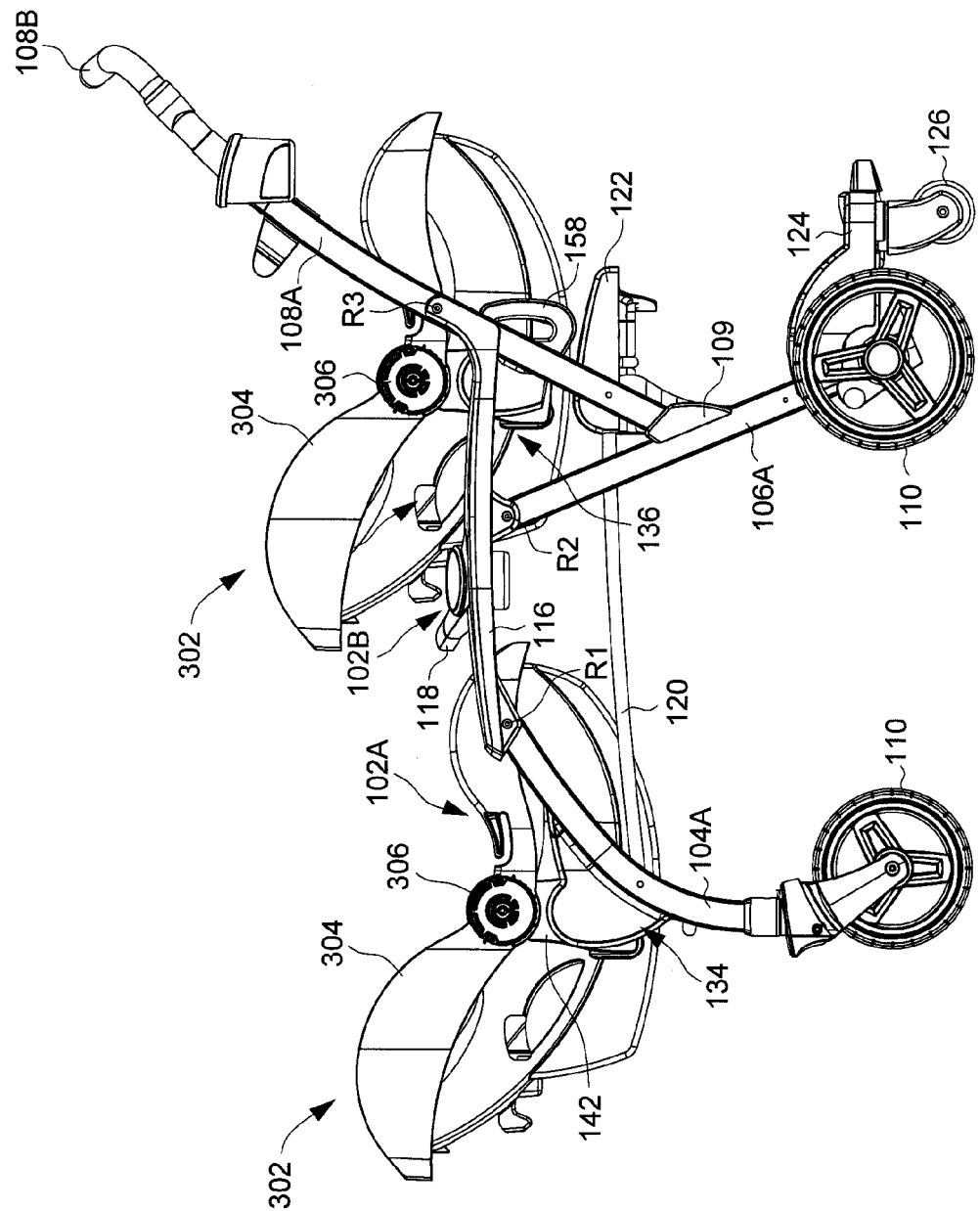
FIG. 12 is a schematic view illustrating another configuration of the infant stroller apparatus having two infant car seats installed facing rearward.

In FIG. 12, the infant stroller apparatus 100 is shown as having two infant car seats 302 respectively engaged with the seat mounts 134 and 136 in the front and rear seat areas 102A and 102B. Both the infant car seats 302 are arranged facing rearward on the stroller frame 102. The position of the crossbar 118 between the seat mounts 134 and the seat mounts 136 can fill the clearance between the two infant car seats 302, and help to contain a child in the infant car seat 302 placed in the front seat area 102A.

Figure 13:
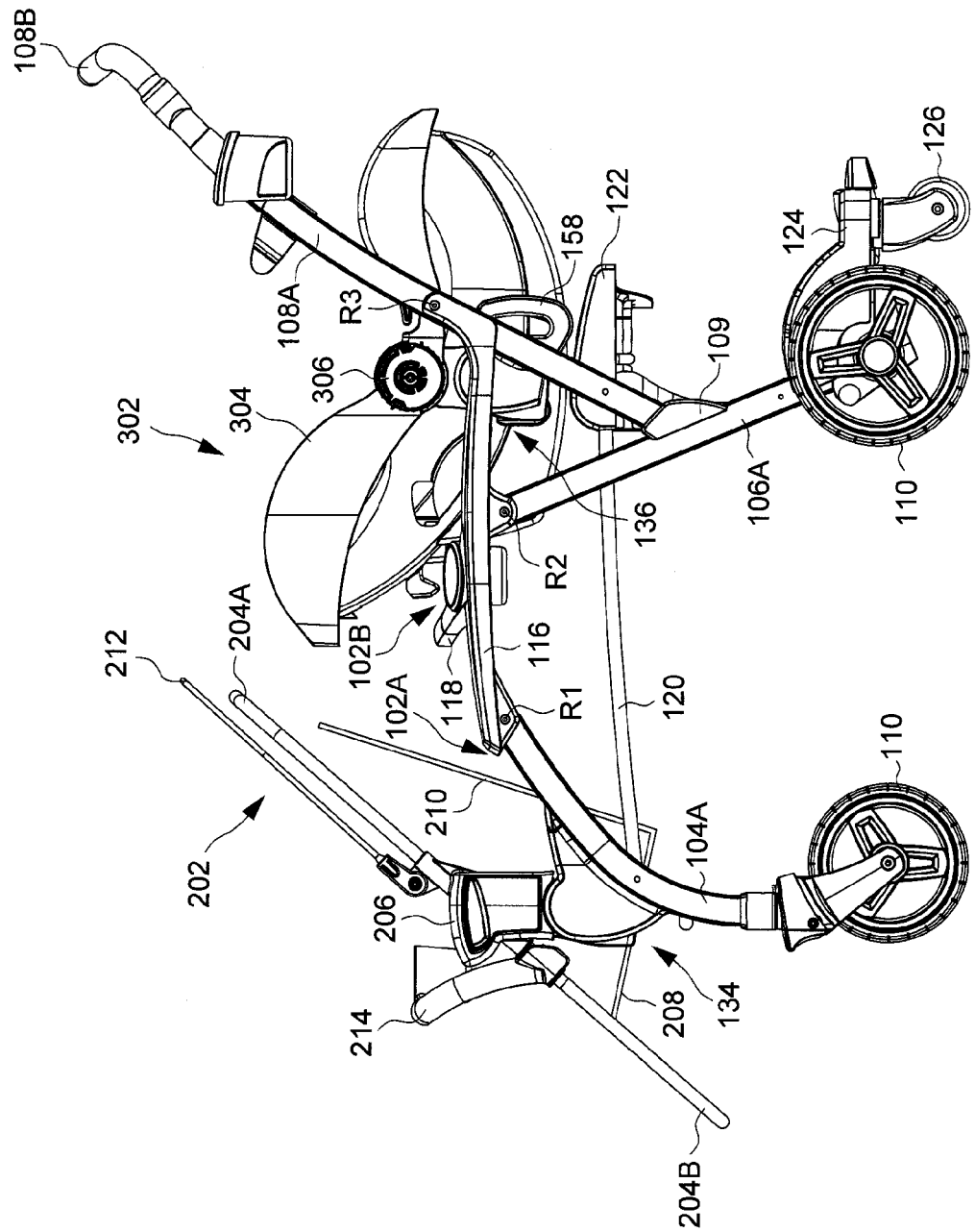
FIG. 13 is a schematic view illustrating another configuration of the infant stroller apparatus having one stroller seat installed in a front position facing forward and one infant car seat installed in a rear position facing rearward.

In FIG. 13, the infant stroller apparatus 100 is shown as having one stroller seat 202 engaged with the seat mounts 134 in the front seat area 102A, and one infant car seat 302 engaged with the seat mounts 136 in the rear seat area 102B. The stroller seat 202 is installed facing forward, whereas the infant car seat 302 is installed facing rearward.

Figure 14:
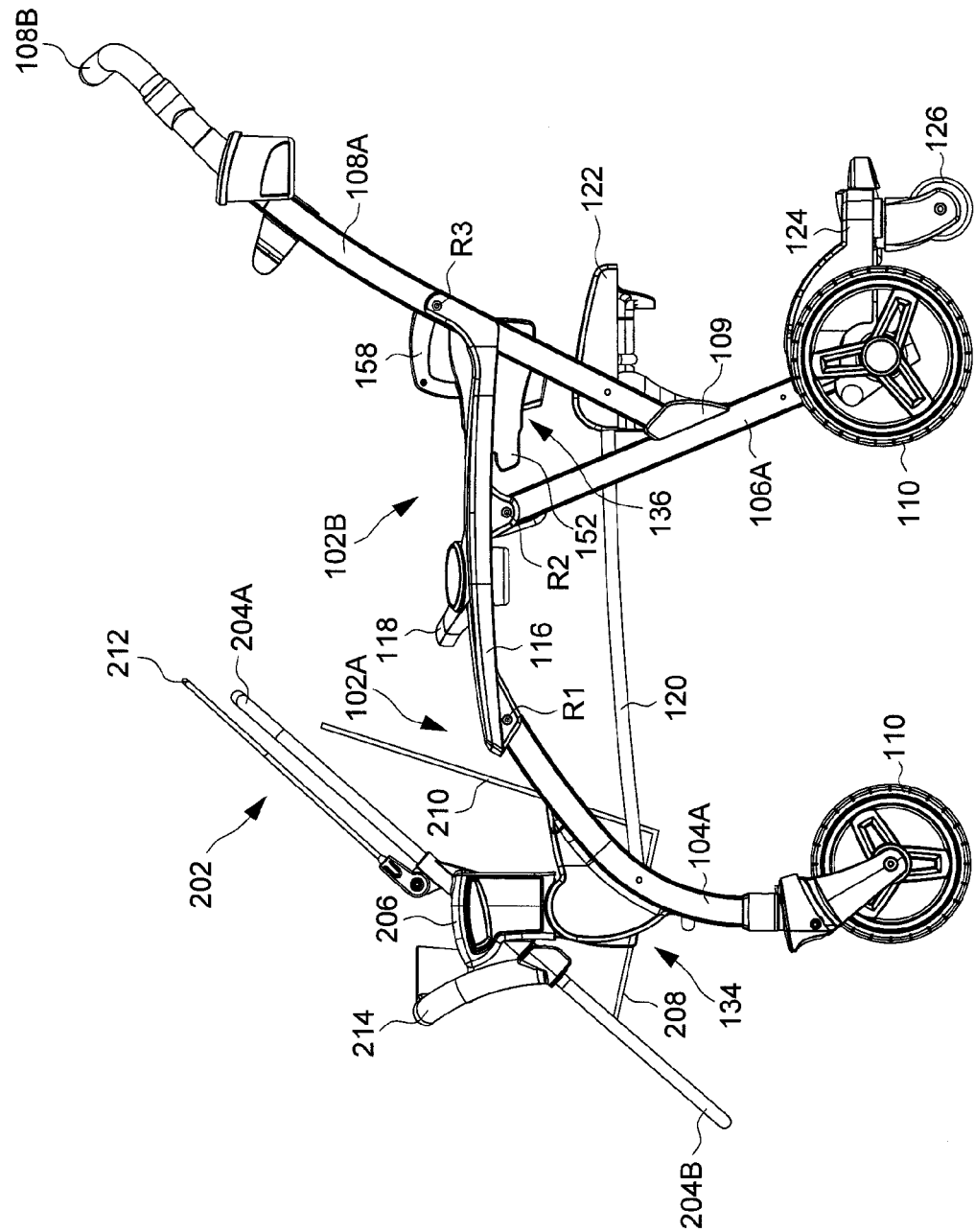
FIG. 14 is a schematic view illustrating another configuration of the infant stroller apparatus having one stroller seat installed in a front position facing forward.

In FIG. 14, the infant stroller apparatus 100 is shown as having one stroller seat 202 facing forward that is engaged with the seat mounts 134 in the front seat area 102A, whereas no seat is installed on the seat mounts 136 in the rear seat area 102B. In this configuration, an older child may sit on the bench seat 122, or stand on the stand platform 124. Moreover, the seat mounts 136 may be adjusted to the stowed state so that the handles 158 can protrude upward above the mount portions 152, so that the child sitting on the bench seat 122 or standing on the stand platform 124 facing forward can grasp the handles 158 for support.

Figure 15:
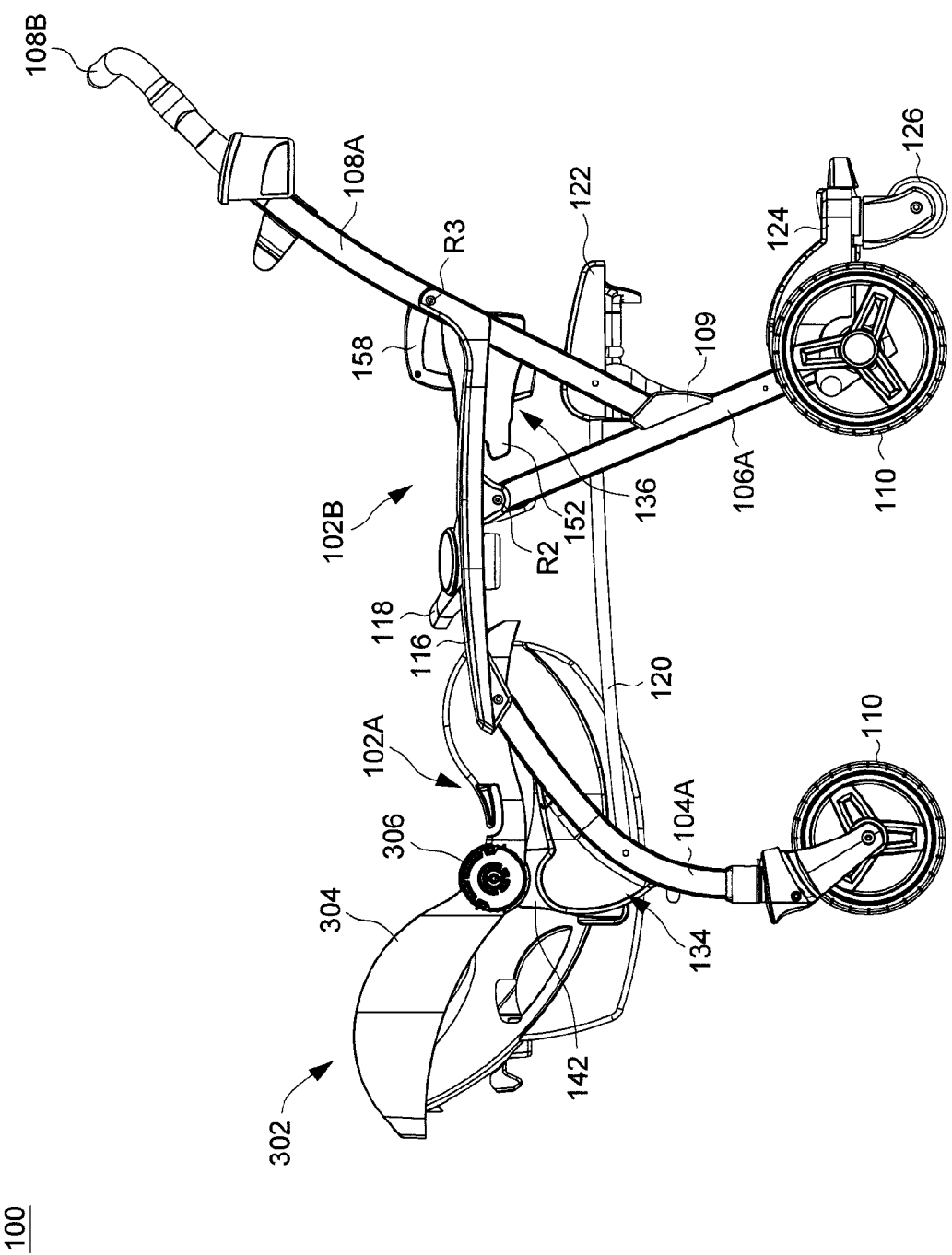
FIG. 15 is a schematic view illustrating another configuration of the infant stroller apparatus having one infant car seat installed in a front position facing rearward.

In FIG. 15, the infant stroller apparatus 100 is shown as having one infant car seat 302 that is arranged facing rearward and is engaged with the seat mounts 134 in the front seat area 102A, whereas no seat is installed on the seat mounts 136 in the rear seat area 102B. In this configuration, an older child may sit on the bench seat 122, or stand on the stand platform 124. Like previously described, the seat mounts 136 may be adjusted to the stowed state so that the handles 158 can protrude upward and be grasped by the child sitting on the bench seat 122 or standing on the stand platform 124 facing forward.

Figure 16:
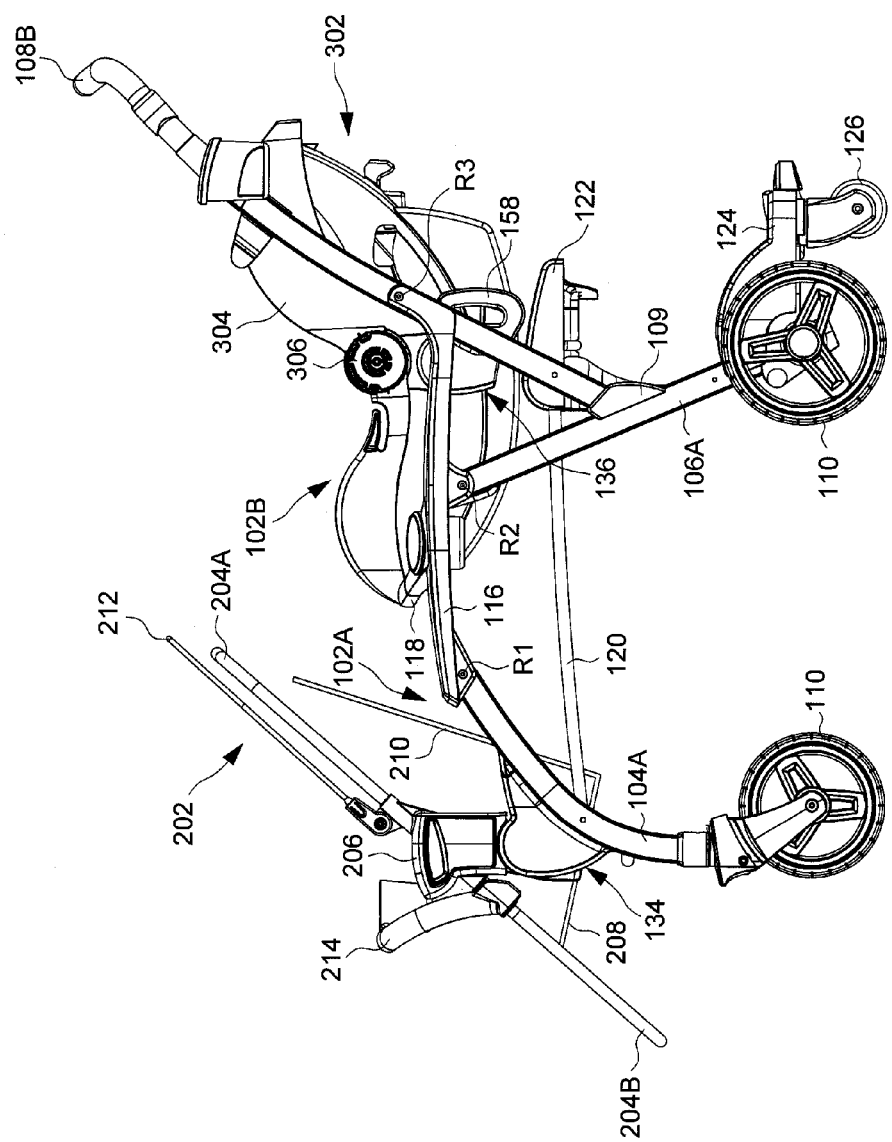
FIG. 16 is a schematic view illustrating another configuration of the infant stroller apparatus having one stroller seat installed in a front position facing forward, and one infant car seat installed in a rear position facing forward.

In FIG. 16, the infant stroller apparatus 100 is shown as having one stroller seat 202 engaged with the seat mounts 134 in the front seat area 102A, and one infant car seat 302 engaged with the seat mounts 136 in the rear seat area 102B. Both the stroller seat 202 and infant car seat 302 may be installed facing forward.

Figure 17:
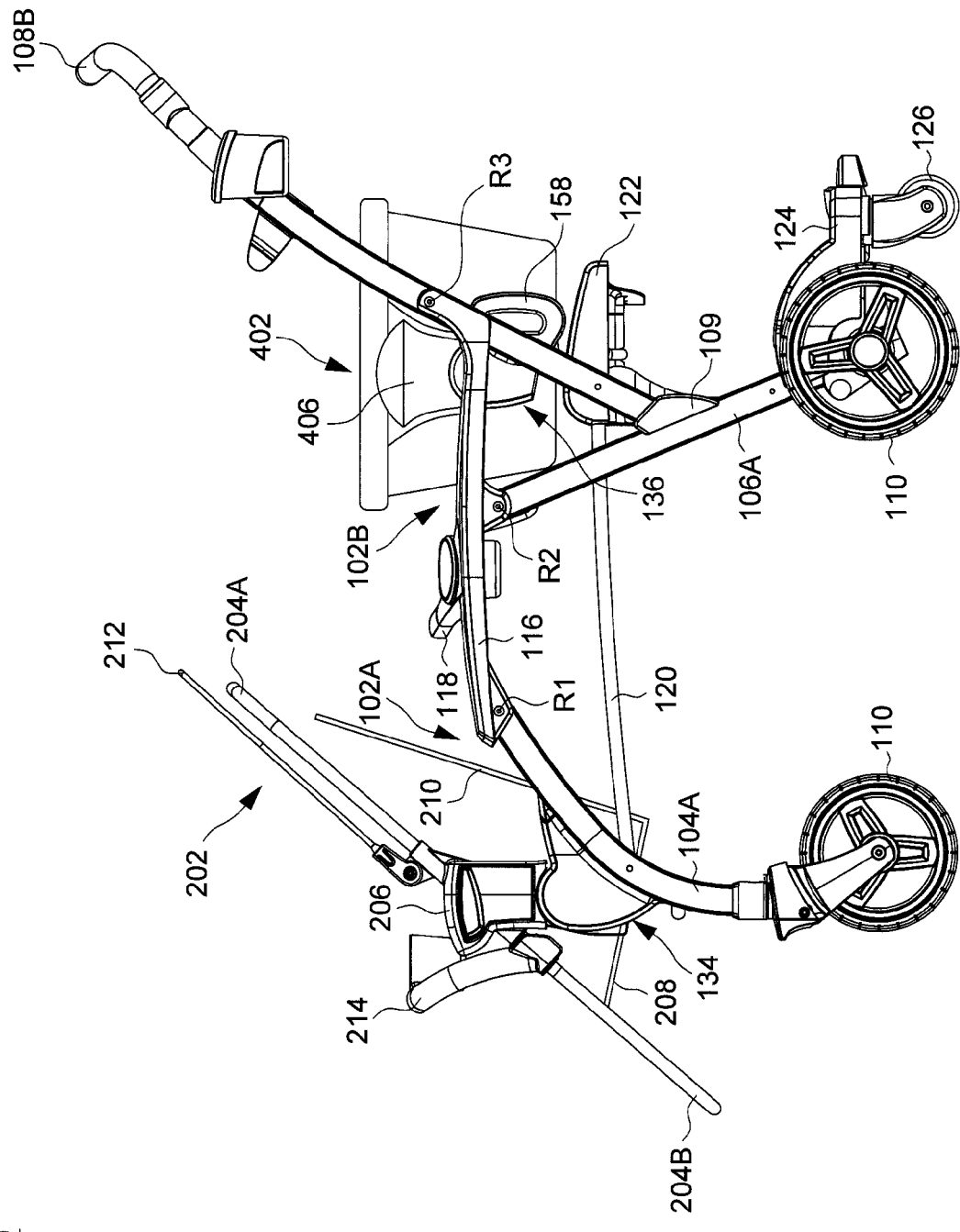
FIG. 17 is a schematic view illustrating a variant accessory item that can be detachably installed on the stroller frame.

While the foregoing has illustrated some examples of installing one or more seats on the stroller frame 102, it will be understood that other combinations or configurations of seats may be possible. Moreover, in addition to detachable seats, other types of accessory items may be configured so as to be installable on the seat mounts 134 or 136. For example, FIG. 17 is a schematic view illustrating an accessory item 402 that may have two opposite sides provided with suitable sockets 406 (which may be similar to the sockets 206 of the stroller frame 202 described previously) that are engageable with the seat mounts 134 or 136, thereby allowing its installation on the stroller frame 102. The accessory item 402 may include, without limitation, a carry cot, a bassinet, a pet carrier, a storage basket and the like. While the accessory item 402 is shown as being installed in the rear seat area 102B and engaged with the seat mounts 136, it may also be possible to place the accessory item 402 in the front seat area 102A engaged with the seat mounts 134.

Figure 18:
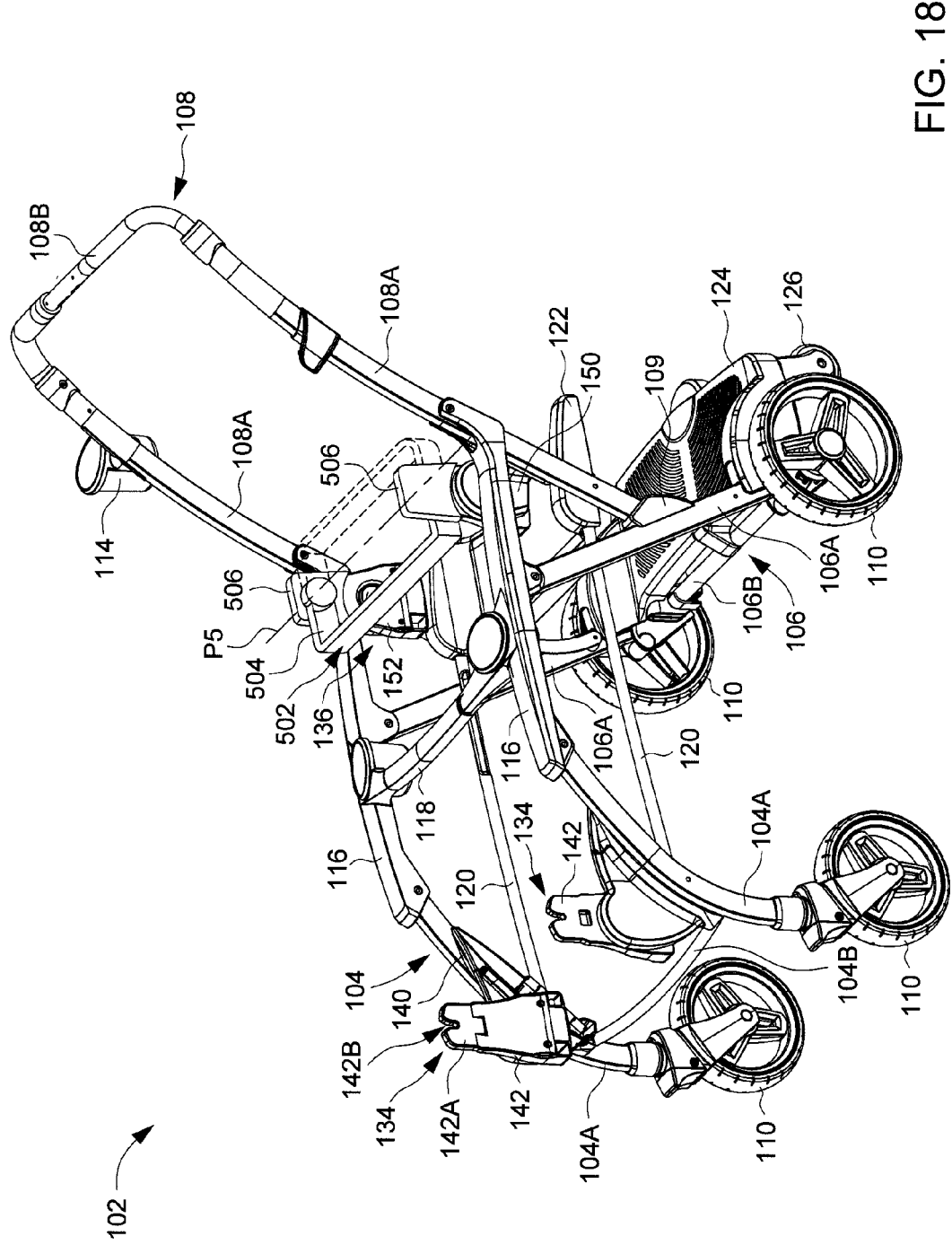
FIG. 18 is a schematic view illustrating an another accessory item embodied as a bar assembly that can be detachable installed on the stroller frame.

While the mount portions 152 of the seat mounts 136 have been described as including handles 158, other embodiments may also provide a handle member as a separate assembly. In this regard, FIG. 18 is a schematic view illustrating another accessory item embodied as a bar assembly 502 that can be detachably engaged with the seat mounts 136. In the embodiment of FIG. 18, the mount portions 152 of the seat mounts 136 have no handles 158 (as shown in FIG. 1). The bar assembly 502 can include a transversal bar 504 having two opposite ends respectively pivotally connected with two sockets 506 about a pivot axis P5. The sockets 506 can engage and disengage the mount portions 152 of the seat mounts 136 for installing or removing the bar assembly 502. When the bar assembly 502 is installed on the stroller frame 102, the pivot axis P5 extends transversally from the left to right side of the stroller frame 102, and the transversal bar 504 can rotate relative to the sockets 506 about the pivot axis P5 between a forward position (shown with solid lines in FIG. 18) and a rearward position (shown with phantom lines in FIG. 18). When it is in the forward position, the transversal bar 504 is placed forward (i.e., toward the front of the stroller frame 102) relative to the pivot axis P5, and can support the back of a child sitting on the bench seat 122 facing rearward. When it is in the rearward position, the transversal bar 504 is placed rearward (i.e., toward the rear of the stroller frame 102) relative to the pivot axis P5, and can be used as a handle that can be grasped by a child standing on the stand platform 124 facing forward.

Advantages of the infant stroller apparatus described herein include the ability to provide a stroller frame that can receive multiple detachable seats. The stroller frame includes two pairs of seat mounts, each pair being respectively able to receive the installation of a stroller seat or infant car seat facing forward or rearward. Accordingly, the stroller frame can offer more seating configurations according to the caregiver's needs, and the infant stroller apparatus can be more flexible in use.

Realization of the infant stroller apparatus has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. An infant stroller apparatus comprising:
a stroller frame having a left and a right side;
two first seat mounts respectively affixed with the stroller frame at the left and right sides thereof, each of the first seat mounts being positionable to protrude upward, the first seat mounts being configured to detachably engage with any of a stroller seat and an infant car seat as a first seat, wherein each of the first seat mounts includes a bracket affixed with the stroller frame, and a mount portion pivotally connected with the bracket, the mount portions at the left and right sides being respectively rotatable about two pivot axes, the two pivot axes respectively extending generally parallel to the left and right sides of the stroller frame; and
two second seat mounts respectively affixed with the stroller frame and arranged behind the first seat mounts, each of the second seat mounts being positionable to protrude upward, the second seat mounts being configured to detachably engage with any of a stroller seat and an infant car seat as a second seat;
wherein each of the first and second seat mounts is adjustable between a deployed state and a stowed state.

2. The infant stroller apparatus according to claim 1, wherein the second seat mounts are placed higher than the first seat mounts on the stroller frame.

3. The infant stroller apparatus according to claim 1, wherein the first seat mounts are configured to engage with the first seat placed facing forward or rearward, and the second seat mounts are configured to engage with the second seat placed facing forward or rearward.

4. The infant stroller apparatus according to claim 1, wherein each of the second seat mounts includes a second bracket affixed with the stroller frame, and a second mount portion pivotally connected with the second bracket.

5. The infant stroller apparatus according to claim 4, wherein the second mount portion in at least one of the two second seat mounts is affixed with a handle, the handle protruding rearward from the second mount portion in the deployed state, and upward above the second mount portion in the stowed state.

6. The infant stroller apparatus according to claim 5, wherein the stroller frame is further affixed with a stand platform, the handle being graspable by a child standing on the stand platform when the corresponding second seat mount is in the stowed state.

7. The infant stroller apparatus according to claim 1, wherein each of the two second seat mounts includes a second bracket affixed with the stroller frame, and a second mount portion pivotally connected with the second bracket, the second mount portions at the left and right sides being respectively rotatable about a pivot axis extending transversally from the left to right side of the stroller frame.

8. The infant stroller apparatus according to claim 7, wherein the second mount portion in at least one of the two second seat mounts includes a plurality of teeth operable to engage with the second bracket to lock the second mount portion in either of the deployed and stowed state, the second mount portion being further slidable to disengage and engage the teeth with respect to the second bracket.

9. The infant stroller apparatus according to claim 8, wherein the second mount portion provided with the teeth is spring biased to have the teeth engaged with the second bracket.

10. The infant stroller apparatus according to claim 1, wherein the stroller frame includes a front leg frame, and the first seat mounts are affixed with the front leg frame.

11. The infant stroller apparatus according to claim 1, wherein the stroller frame includes a handle frame, and the second seat mounts are affixed with the handle frame.

12. The infant stroller apparatus according to claim 11, wherein the stroller frame further includes two first side segments respectively arranged at the left and right sides of the stroller frame and pivotally connected with the handle frame about a first pivot axis extending transversally from the left to the right sides, and two second side segments respectively arranged at the left and right sides of the stroller frame and pivotally connected with the handle frame about a second pivot axis extending transversally from the left to the right sides, the second seat mounts being connected with the handle frame in a region between the first and second pivot axes.

13. The infant stroller apparatus according to claim 12, wherein the second side segments are respectively affixed with a bench seat, the second seat mounts being located above the bench seat when the infant stroller apparatus is in an unfolded state.

14. The infant stroller apparatus according to claim 1, wherein the stroller frame includes a front leg frame, a rear leg frame, a handle frame, and two side segments respectively connected pivotally with the handle frame and the front and rear leg frames at the left and right sides of the stroller frame, the front leg frame being affixed with the first seat mounts, the handle frame being affixed with the second seat mounts, and the two side segments being affixed with a crossbar arranged between the first seat mounts and the second seat mounts.

15. An infant stroller apparatus comprising:
a stroller frame having a left and a right side, the stroller frame including a front leg frame, a rear leg frame, a handle frame, and two side segments respectively connected pivotally with the handle frame and the front and rear leg frames at the left and right sides of the stroller frame;
two first seat mounts respectively affixed with the front leg frame of the stroller frame at the left and right sides thereof, the first seat mounts being configured to detachably engage with a first seat; and
two second seat mounts respectively affixed with the handle frame of the stroller frame at the left and right sides thereof and arranged spaced apart from the first seat mounts, the second seat mounts being configured to detachably engage with a second seat;
wherein each of the first and second seat mounts is adjustable between a deployed state and a stowed state.

16. The infant stroller apparatus according to claim 15, wherein each of the first seat mounts includes a first bracket affixed with the front leg frame of the stroller frame, and a first mount portion pivotally connected with the first bracket, the first mount portions at the left and right sides being respectively rotatable about two pivot axes, the two pivot axes respectively extending generally parallel to the left and right sides of the stroller frame.

17. The infant stroller apparatus according to claim 15, wherein each of the two second seat mounts includes a second bracket affixed with the handle frame of the stroller frame, and a second mount portion pivotally connected with the second bracket, the second mount portions at the left and right sides being respectively rotatable about a pivot axis extending transversally from the left to right side of the stroller frame.

18. The infant stroller apparatus according to claim 17, wherein the second mount portion in at least one of the two second seat mounts includes a plurality of teeth operable to engage with the second bracket to lock the second mount portion in either of the deployed and stowed state, the second mount portion being further slidable along the pivot axis to disengage and engage the teeth with respect to the second bracket.

19. The infant stroller apparatus according to claim 17, wherein the second mount portion in each of the two second seat mounts is respectively affixed with a handle.

20. The infant stroller apparatus according to claim 19, wherein the handle protrudes rearward in the deployed state and upward in the stowed state.

21. The infant stroller apparatus according to claim 20, wherein the stroller frame is further affixed with a stand platform, the handle of the second mount portion in each of the two second seat mounts being graspable by a child standing on the stand platform while the second seat mounts are in the stowed state.

22. The infant stroller apparatus according to claim 15, wherein the two side segments are affixed with a crossbar arranged between the first and second seat mounts.

23. The infant stroller apparatus according to claim 15, wherein the stroller frame further includes two second side segments arranged below the two side segments and respectively connected pivotally with the front leg frame and the handle frame, the second side segments being respectively affixed with a bench seat, the second seat mounts being located above the bench seat.

24. The infant stroller apparatus according to claim 1, wherein the two pivot axes of the two mount portions are inclined at an angle relative to a vertical axis.

25. The infant stroller apparatus according to claim 10, wherein the front leg frame includes two front leg segments to which are respectively affixed the brackets of the two first seat mounts, the mount portions of the two first seat mounts being placed at a forward position relative to the two front leg segments when the two first seat mounts are in the deployed state, and the mount portions of the two first seat mounts are placed in a position extending behind the two front leg segments when the two first seat mounts are in the stowed state.

26. An infant stroller apparatus comprising:
a stroller frame having a left and a right side, the stroller frame including a front leg frame, a handle frame, two first side segments respectively arranged at the left and right sides of the stroller frame and pivotally connected with the handle frame about a first pivot axis extending transversally from the left to the right sides, and two second side segments respectively arranged at the left and right sides of the stroller frame below the first side segments and pivotally connected with the handle frame about a second pivot axis extending transversally from the left to the right sides;
two first seat mounts respectively affixed with the stroller frame at the left and right sides thereof, the first seat mounts being configured to detachably engage with a first seat, wherein each of the first seat mounts includes a first bracket affixed with the front leg frame, and a first mount portion pivotally connected with the first bracket, the first mount portions at the left and right sides being respectively rotatable about two pivot axes, the two pivot axes respectively extending generally parallel to the left and right sides of the stroller frame; and
two second seat mounts respectively affixed with the handle frame at the left and right sides thereof and arranged spaced apart from the first seat mounts, the second seat mounts being connected with the handle frame in a region between the first and second pivot axes, the second seat mounts being configured to detachably engage with a second seat.

27. The infant stroller apparatus according to claim 26, wherein the two first side segments are affixed with a crossbar arranged between the first and second seat mounts.

28. The infant stroller apparatus according to claim 26, wherein each of the second seat mounts includes a second bracket affixed with the handle frame, and a second mount portion pivotally connected with the second bracket.

29. The infant stroller apparatus according to claim 28, wherein the second mount portion in each of the two second seat mounts is respectively affixed with a handle, the handle protruding rearward when the corresponding second seat mount is in a deployed state for use, and the handle protruding upward when the corresponding second seat mount is in a stowed state.

* * * * *